United States Patent
Li et al.

(10) Patent No.: US 9,756,521 B2
(45) Date of Patent: Sep. 5, 2017

(54) MEASUREMENT METHOD, USER EQUIPMENT, BASE STATION, AND WIRELESS COMMUNICATIONS SYSTEM

(71) Applicant: HUAWEI TECHNOLOGIES CO., LTD., Shenzhen (CN)

(72) Inventors: Anjian Li, Beijing (CN); Dengkun Xiao, Shenzhen (CN); Jing Han, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 14/806,990

(22) Filed: Jul. 23, 2015

(65) Prior Publication Data

US 2015/0326366 A1    Nov. 12, 2015

Related U.S. Application Data

(63) Continuation of application No. PCT/CN2013/070947, filed on Jan. 24, 2013.

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0051* (2013.01); *H04W 48/16* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 8,780,688 B2 | 7/2014 | Siomina et al. | |
| 2009/0191863 A1* | 7/2009 | Kazmi | H04W 24/10 455/424 |

(Continued)

FOREIGN PATENT DOCUMENTS

| | | |
|---|---|---|
| CN | 101595746 A | 12/2009 |
| CN | 102448102 | 5/2012 |
| CN | 102685795 | 9/2012 |
| WO | 2012/044019 A2 | 4/2012 |
| WO | WO2012150894 | 11/2012 |

OTHER PUBLICATIONS

PCT International Search Report dated Oct. 31, 2013 in corresponding International Patent Application No. PCT/CN2013/070947.
(Continued)

*Primary Examiner* — Gary Mui
(74) *Attorney, Agent, or Firm* — Staas & Halsey LLP

(57) ABSTRACT

Embodiments of the present invention disclose a measurement method, user equipment, a base station, and a wireless communications system, where the method includes: determining, according to transmit bandwidth and transmit time of a new carrier type cell-specific reference signal in a cell of the first base station and the transmit bandwidth and the transmit time of the new carrier type cell-specific reference signal in the cell of the second base station, measurement bandwidth and measurement time corresponding to a cell in which user equipment is located; and transmitting measurement configuration information including the measurement bandwidth and the measurement time to the user equipment. The first base station may acquire the transmit bandwidth and the transmit time, and deliver, to UE, measurement configuration information including two pieces of information, namely, measurement bandwidth and measurement time. Therefore, a solution for performing effective measurement in a new carrier type is provided.

18 Claims, 7 Drawing Sheets

(51) Int. Cl.
*H04W 48/16* (2009.01)
*H04W 92/20* (2009.01)

(56) References Cited

U.S. PATENT DOCUMENTS

| | | | |
|---|---|---|---|
| 2010/0285802 A1* | 11/2010 | Ahluwalia | H04W 36/0083 455/436 |
| 2010/0323688 A1* | 12/2010 | Kazmi | H04W 36/30 455/424 |
| 2012/0170458 A1 | 7/2012 | Zee et al. | |
| 2012/0252487 A1* | 10/2012 | Siomina | H04W 24/10 455/456.1 |
| 2012/0276916 A1 | 11/2012 | Kazmi et al. | |
| 2013/0201884 A1* | 8/2013 | Freda | H04W 72/005 370/278 |
| 2013/0250882 A1* | 9/2013 | Dinan | H04W 72/0426 370/329 |
| 2013/0267230 A1 | 10/2013 | Lin et al. | |
| 2013/0308481 A1* | 11/2013 | Kazmi | H04W 24/02 370/252 |
| 2014/0098691 A1* | 4/2014 | Kazmi | G01S 5/12 370/252 |

OTHER PUBLICATIONS

"LS on signalling Intra/Inter-frequency measurement bandwidth", 3GPP TSG-RAN WG4 Meeting #46, R4-080541, Sorrento, Italy, Feb. 11-15, 2008, 1 p.

"LS on the RS for additional carrier types for carrier aggregation enhancement", 3GPP TSG RAN WG1 Meeting #68bis, R1-121900, Jeju, Korea, Mar. 26-30, 2012, 2 pp.

"Way Forward on Rel-11 completion in RAN1", 3GPP TSG-RAN Meeting #56, RP-120856, Ljubljana, Slovenia, Jun. 13-15, 2012, 2 pp.

"Further Discussion of the RSRQ measurement bandwidth", 3GPP TSG-RAN WG4 Meeting #63 UE performance AH, R4-63AH-0159, Oulu, Finland, Jun. 26-28, 2012, 2 pp.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.2.0, Dec. 2012, pp. 1-340.

"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423, V11.3.0, Dec. 2012, pp. 1-141.

*Autonomous inter-cell interference cancellation*, 3GPP TSG RAN WG1 Meeting#69, R1-122890, Prague, CZ, May 21-25, 2012, XIP50601154A, pp. 1-7.

*RRM measurements for NCT*, 3GPP TSG RAN WG1 Meeting #72, R1-130436, St. Julian's, Malta, Jan. 28-Feb. 1, 2013, XP50663719A (4 pp.).

Extended European Search Report, dated Feb. 25, 2016, in corresponding European Application No. 13872960.3 (10 pp.).

International Search Report mailed Oct. 31, 2013, in corresponding International Application No. PCT/CN2013/070947.

R1-130437, "Mobility support across carrier types", Huawei, HiSilicon, 3GPP TSG RAN WG1 Meeting #72 St. Julian's, Malta, Jan. 28-Feb. 2013, total 4 pages.

\* cited by examiner

MEASUREMENT METHOD, USER EQUIPMENT, BASE STATION, AND WIRELESS COMMUNICATIONS SYSTEM

CROSS-REFERENCE TO RELATED APPLICATIONS

This application is a continuation of International Application No. PCT/CN2013/070947, filed on Jan. 24, 2013, which is hereby incorporated by reference in its entirety.

TECHNICAL FIELD

The present invention relates to the field of communications technologies, and in particular, to a measurement method, user equipment, a base station, and a wireless communications system.

BACKGROUND

In a current LTE (Long Term Evolution) protocol, RRM (Radio Resource Management) measurement quantities include: RSRP (Reference Signal Received Power) and RSRQ (Reference Signal Received Quality). RSRP reflects strength of a received signal, and RSRQ reflects channel quality, where RSRQ is related to load of a local cell and a neighboring cell. Currently defined RSRP measurement and RSRQ measurement are both based on a CRS (Cell-specific Reference Signal) transmitted by a cell. In a time domain, a CRS in an existing cell is transmitted in every subframe; therefore, for the RSRP measurement and RSRQ measurement, it is unnecessary to specify subframes in which UE (User Equipment) performs measurement. In a frequency domain, CRSs are scattered in entire system bandwidth; therefore, the UE may perform measurement in six central PRBs (Physical Resource Block) or in measurement bandwidth delivered by a system.

Related content of measurement in 3GPP (3rd Generation Partnership Project) protocol release 8/9 (Rel-8/9) is generally as follows:

Measurement quantity: measurement quantities in Rel-8/9 are RSRP and RSRQ. The UE reports RSRP/RSRQ periodically or after an event is satisfied.

Measurement period: a current specification for RSRP and RSRQ measurement bandwidth is embodied in a MeasObjectEUTRA field in system messages SIB3 (System Information Block 3) and SIB5 and RRC (Radio Resource Control) signaling, and is embodied by using an AllowedMeasBandwidth IE (Information Element), where AllowedMeasBandwidth represents maximum allowed measurement bandwidth. In other words, the UE may perform measurement of bandwidth less than AllowedMeasBandwidth. Because the UE reports only RSRP/RSRQ, a network side cannot know how much measurement bandwidth is used by the UE.

In the frequency domain, measurement performed by the UE is based on measurement bandwidth. The measurement bandwidth may be the six central PRBs. Alternatively, referring to AllowedMeasBandwidth transmitted by a network, the UE performs measurement according to measurement bandwidth greater than the six PRBs. The UE only needs to satisfy a requirement of measurement precision.

In the time domain, the UE may currently perform measurement based on any subframe, which is not limited at all in standards. Typically, in a specific measurement period, the UE may collect multiple subframes at equal intervals to perform RSRP or RSRQ measurement to obtain measurement results, and then perform averaging on the multiple measurement results corresponding to the multiple subframes, so as to reduce impact of radio channel fading on RSRP or RSRQ measurement precision.

NCT (New Carrier Type) is introduced in a discussion about R12 standards. In these carrier types, CRS transmission is different from a current CRS transmission mechanism in the frequency domain and the time domain, so that a current UE measurement mechanism cannot work normally in an NCT scenario. Therefore, how to perform measurement in a new carrier type needs to be redefined.

SUMMARY

Embodiments of the present invention provide a measurement method, user equipment, a base station, and a wireless communications system, which are used to provide a measurement solution in a new carrier type.

A first aspect of the embodiments of the present invention provides a measurement method, including:

acquiring, by a first base station, transmit bandwidth and transmit time of a new carrier type cell-specific reference signal in a cell of a second base station through an inter-base-station interface, where the second base station is one or a plurality of base stations, and an inter-base-station interface exists between the second base station and the first base station;

determining, according to transmit bandwidth and transmit time of a new carrier type cell-specific reference signal in a cell of the first base station and the transmit bandwidth and the transmit time of the new carrier type cell-specific reference signal in the cell of the second base station, measurement bandwidth and measurement time corresponding to a cell in which user equipment is located; and transmitting measurement configuration information including the measurement bandwidth and the measurement time to the user equipment.

With reference to the implementation manner of the first aspect, in a first possible implementation manner, the transmitting measurement configuration information including the measurement bandwidth and the measurement time to the user equipment includes:

if the user equipment is currently in a connected state, transmitting, by using dedicated radio resource control signaling, the measurement configuration information including the measurement bandwidth and the measurement time to the user equipment; or if the user equipment is currently in a non-connected state, transmitting, by using a radio resource control broadcast message, the measurement configuration information including the measurement bandwidth and the measurement time to the user equipment.

With reference to the implementation manner of the first aspect or the first possible implementation manner, in a second possible implementation manner, the measurement configuration information further includes a reporting criterion; and after the transmitting measurement configuration information including the measurement bandwidth and the measurement time to the user equipment, the method further includes: receiving a measurement result that is reported by the user equipment according to the reporting criterion, and then performing mobility management on the user equipment according to the measurement result.

With reference to the implementation manner of the first aspect or the first or second possible implementation manner, in a third possible implementation manner, a period of a subframe of the new carrier type cell-specific reference signal is 5 milliseconds, and the determined measurement time corresponding to the cell in which the user equipment is located is starting time of the period of the subframe.

A second aspect of the embodiments of the present invention provides a measurement method, including:

receiving, by user equipment, measurement configuration information from a first base station, where the measurement configuration information includes measurement bandwidth and measurement time; the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station, where the second base station is one or a plurality of base stations, and an inter-base-station interface exists between the second base station and the first base station; and parsing the measurement configuration information to obtain the measurement bandwidth and the measurement time, and performing measurement by using the measurement bandwidth and the measurement time to obtain a measurement result.

With reference to the implementation manner of the second aspect, in a first possible implementation manner, the receiving, by user equipment, measurement configuration information from a first base station includes:

when the user equipment is in a connected state, receiving the measurement configuration information by using dedicated radio resource control signaling; or when the user equipment is in a non-connected state, receiving the measurement configuration information by using a radio resource control broadcast message.

With reference to the implementation manner of the second aspect or the first possible implementation manner, in a second possible implementation manner, the measurement configuration information further includes a reporting criterion, and after the performing measurement by using the measurement bandwidth and the measurement time to obtain a measurement result, the method further includes:

transmitting the measurement result to the first base station according to the reporting criterion in the measurement configuration information when the user equipment is in the connected state; or transmitting the measurement result to a radio resource control layer in the user equipment when the user equipment is in the non-connected state.

With reference to the implementation manner of the second aspect or the first or second possible implementation manner, in a third possible implementation manner, a period of a subframe of the new carrier type cell-specific reference signal is 5 milliseconds, and the measurement time included in the received measurement configuration information is starting time of the period of the subframe.

A third aspect of the embodiments of the present invention provides a base station, including:

a first receiving unit, configured to acquire transmit bandwidth and transmit time of a new carrier type cell-specific reference signal in a cell of a second base station through an inter-base-station interface, where the base station is a first base station, and the second base station is one or a plurality of base stations, where an inter-base-station interface exists between the second base station and the first base station;

an information determining unit, configured to determine, according to transmit bandwidth and transmit time of a new carrier type cell-specific reference signal in a cell of the first base station and the transmit bandwidth and the transmit time that are of the new carrier type cell-specific reference signal in the cell of the second base station and acquired by the first receiving unit, measurement bandwidth and measurement time corresponding to a cell in which user equipment is located;

a configuring unit, configured to configure measurement configuration information including the measurement bandwidth and the measurement time that are determined by the information determining unit; and a first transmitting unit, configured to transmit the measurement configuration information configured by the configuring unit to the user equipment.

With reference to the implementation manner of the third aspect, in a first possible implementation manner, the first transmitting unit is specifically configured to: if the user equipment is currently in a connected state, transmit the measurement configuration information to the user equipment by using dedicated radio resource control signaling; or if the user equipment is currently in a non-connected state, transmit the measurement configuration information to the user equipment by using a radio resource control broadcast message.

With reference to the implementation manner of the third aspect or the first possible implementation manner, in a second possible implementation manner, the configuring unit is further configured to configure a reporting criterion in the measurement configuration information; and the base station further includes:

a second receiving unit, configured to: after the first transmitting unit transmits the measurement configuration information to the user equipment, receive a measurement result that is reported by the user equipment according to the reporting criterion; and a management unit, configured to perform mobility management on the user equipment according to the measurement result received by the second receiving unit.

With reference to the implementation manner of the third aspect or the first or second possible implementation manner, in a third possible implementation manner, a period of a subframe of the new carrier type cell-specific reference signal is 5 milliseconds, and the measurement time that is determined by the information determining unit and corresponding to the cell in which the user equipment is located is starting time of the period of the subframe.

A fourth aspect of the embodiments of the present invention provides user equipment, including:

a third receiving unit, configured to receive measurement configuration information from a first base station, where the measurement configuration information includes measurement bandwidth and measurement time; the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station; and the second base station is one or a plurality of base stations, where an inter-base-station interface exists between the second base station and the first base station;

a parsing unit, configured to parse the measurement configuration information received by the third receiving unit to obtain the measurement bandwidth and the measurement time; and a measuring unit, configured to perform measurement by using the measurement bandwidth and the measurement time that are parsed out by the parsing unit, to obtain a measurement result.

With reference to the implementation manner of the fourth aspect, in a first possible implementation manner, the third receiving unit is specifically configured to: when the user equipment is in a connected state, receive the measurement configuration information by using dedicated radio resource control signaling; or the third receiving unit is specifically configured to: when the user equipment is in a non-connected state, receive the measurement configuration information by using a radio resource control broadcast message.

With reference to the implementation manner of the fourth aspect or the first possible implementation manner, in a second possible implementation manner, the measurement configuration information received by the third receiving unit further includes a reporting criterion;

the parsing unit is further configured to parse the measurement configuration information to obtain the reporting criterion; and the user equipment further includes:

a second transmitting unit, configured to: after the measuring unit performs measurement by using the measurement bandwidth and the measurement time to obtain the measurement result, transmit the measurement result to the first base station according to the reporting criterion in the measurement configuration information when the user equipment is in the connected state, or transmit the measurement result to a radio resource control layer in the user equipment when the user equipment is in the non-connected state.

With reference to the implementation manner of the fourth aspect or the first or second possible implementation manner, in a third possible implementation manner, a period of a subframe of the new carrier type cell-specific reference signal is 5 milliseconds, and the measuring unit is specifically configured to perform measurement by using starting time of the period of the subframe as the measurement time.

A fifth aspect of the embodiments of the present invention provides a base station, including: a receiving device, a processor, a memory, and a transmitting device, where the base station is a first base station;

the receiving device is configured to acquire transmit bandwidth and transmit time of a new carrier type cell-specific reference signal in a cell of a second base station through an inter-base-station interface, where the second base station is one or a plurality of base stations, and an inter-base-station interface exists between the second base station and the first base station; and the processor is configured to: determine, according to transmit bandwidth and transmit time of a new carrier type cell-specific reference signal in a cell of the first base station and the transmit bandwidth and the transmit time that are of the new carrier type cell-specific reference signal in the cell of the second base station and received by the receiving device, measurement bandwidth and measurement time corresponding to a cell in which user equipment is located; and instruct the transmitting device to transmit measurement configuration information including the measurement bandwidth and the measurement time to the user equipment.

With reference to the implementation manner of the fifth aspect, in a first possible implementation manner, that the processor is configured to instruct the transmitting device to transmit measurement configuration information including the measurement bandwidth and the measurement time to the user equipment includes that: the processor is configured to: if the user equipment is currently in a connected state, instruct the transmitting device to transmit, by using dedicated radio resource control signaling, the measurement configuration information including the measurement bandwidth and the measurement time to the user equipment; or if the user equipment is currently in a non-connected state, instruct the transmitting device to transmit, by using a radio resource control broadcast message, the measurement configuration information including the measurement bandwidth and the measurement time to the user equipment.

With reference to the implementation manner of the fifth aspect or the first possible implementation manner, in a second possible implementation manner, the processor is further configured to add a reporting criterion to the measurement configuration information;

the receiving device is further configured to: after the processor instructs the transmitting device to transmit the measurement configuration information to the user equipment, receive a measurement result that is reported by the user equipment according to the reporting criterion; and the processor is further configured to perform mobility management on the user equipment according to the measurement result received by the receiving device.

With reference to the implementation manner of the fifth aspect or the first or second possible implementation manner, in a third possible implementation manner, a period of a subframe of the new carrier type cell-specific reference signal is 5 milliseconds, and the measurement time that is transmitted by the transmitting device by being instructed by the processor and that is corresponding to the cell in which the user equipment is located is starting time of the period of the subframe.

A sixth aspect of the embodiments of the present invention provides user equipment, including: a receiving device, a transmitting device, a processor, and a memory;

the receiving device is configured to receive measurement configuration information from a first base station, where the measurement configuration information includes measurement bandwidth and measurement time; the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station; and the processor is configured to parse the measurement configuration information received by the receiving device to obtain the measurement bandwidth and the measurement time, and perform measurement by using the measurement bandwidth and the measurement time to obtain a measurement result, where the second base station is one or a plurality of base stations, and an inter-base-station interface exists between the second base station and the first base station.

With reference to the implementation manner of the sixth aspect, in a first possible implementation manner, the receiving device is specifically configured to: when the user equipment is in a connected state, receive the measurement configuration information by using dedicated radio resource control signaling; or the receiving device is specifically configured to receive, when the user equipment is in a non-connected state, the measurement configuration information by using a radio resource control broadcast message.

With reference to the implementation manner of the sixth aspect or the first possible implementation manner, in a second possible implementation manner, the measurement configuration information received by the receiving device further includes a reporting criterion; and the processor is further configured to: after performing measurement by using the measurement bandwidth and the measurement time to obtain the measurement result, instruct the transmitting device to transmit the measurement result to the first base station according to the reporting criterion in the measurement configuration information when the user equipment is in the connected state, or instruct the transmitting device to transmit the measurement result to a radio resource control layer in the user equipment when the user equipment is in the non-connected state.

With reference to the implementation manner of the sixth aspect or the first or second possible implementation manner, in a third possible implementation manner, a period of a subframe of the new carrier type cell-specific reference signal is 5 milliseconds, and the processor performs measurement by using starting time of the period of the subframe as the measurement time.

A seventh aspect of the embodiments of the present invention provides a mobile communications system, including: a first base station and a second base station, where the first base station is the first base station provided in any one of the embodiments of the present invention; and the second base station is one or a plurality of base stations, where an inter-base-station interface exists between the second base station and the first base station.

It can be seen from the foregoing technical solutions that the embodiments of the present invention have the following advantages: a first base station acquires transmit bandwidth and transmit time of a new carrier type cell-specific reference signal in a cell of a second base station through an inter-base-station interface, and delivers, to UE, measurement configuration information including two pieces of information, namely, measurement bandwidth and measurement time, so that a base station can obtain transmit bandwidth and transmit time of a CRS of a neighboring base station and UE can perform accurate measurement on an NCT serving cell and an NCT neighboring cell. Therefore, a solution for performing effective measurement in a new carrier type is provided.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
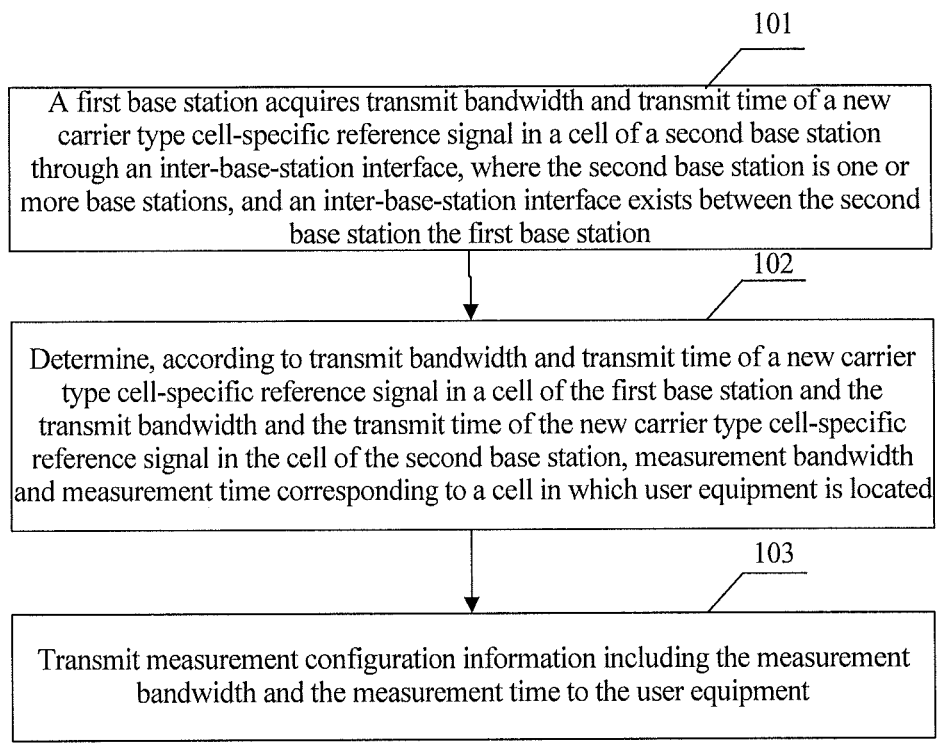
FIG. 1 is a schematic flowchart of a method according to an embodiment of the present invention.

An embodiment of the present invention provides a measurement method. This solution is implemented on a base station side. As shown in FIG. 1, the method includes:

101. A first base station acquires transmit bandwidth and transmit time of a new carrier type cell-specific reference signal in a cell of a second base station through an inter-base-station interface, where the second base station is one or a plurality of base stations, and an inter-base-station interface exists between the second base station and the first base station.

In step 101, because the second base station may be one or a plurality of base stations, transmit bandwidth and transmit time that are of one or more new carrier type cell-specific reference signals in one or more cells of the one or more base stations may be accordingly acquired by the first base station and subsequently used in step 102.

The inter-base-station interface may be an X2 interface, an S1 interface, or the like, and a specific interface type is not limited in this embodiment of the present invention. Using an LTE (Long Term Evolution) network as an example, after the LTE network is deployed, an eNB using an NCT informs, through an inter-eNB X2 interface, a neighboring eNB of NCT CRS transmit bandwidth and NCT CRS transmit time of the eNB. After information exchange between eNBs (evolved NodeB), an eNB can learn NCT CRS transmit bandwidth and NCT CRS transmit time in a cell of a neighboring eNB of the eNB; in the entire LIE network, each eNB can learn NCT CRS transmit bandwidth and NCT CRS transmit time in a cell of a neighboring eNB of the eNB.

Specifically, each eNB includes multiple cells, and cells of a same eNB are managed by the same eNB; therefore, an eNB can learn information about NCT CRS transmit bandwidth and transmit time in cells of the eNB. For cells of different eNBs, an inter-eNB X2 interface may be used to acquire information about NCT CRS transmit bandwidth and NCT CRS transmit time in a cell of another eNB.

102. Determine, according to transmit bandwidth and transmit time of a new carrier type cell-specific reference signal in a cell of the first base station and the transmit bandwidth and the transmit time of the new carrier type cell-specific reference signal in the cell of the second base station, measurement bandwidth and measurement time corresponding to a cell in which user equipment is located.

For example, in a cell of the first base station, new carrier type transmit bandwidth is 10 MHz, and transmit time is the $0^{th}$ subframe and the $5^{th}$ subframe of each radio frame. In a cell that is of the second base station and adjacent to the current cell, used new carrier type transmit bandwidth is 5 MHz, and transmit time is the 0th subframe and the $5^{th}$ subframe of each radio frame. After learning, by using, for example, an X2 interface, information about new carrier type transmit bandwidth and transmit time in the cell of the second base station, the current cell may configure new carrier type measurement bandwidth of the neighboring cell to be 5 MHz, and configure measurement time to be the $0^{th}$ subframe and the $5^{th}$ subframe of each radio frame.

For another example, in a cell of the first base station, new carrier type transmit bandwidth is 10 MHz, and transmit time is the $0^{th}$ subframe and the $5^{th}$ subframe of each radio frame. In a cell that is of the second base station and adjacent to the current cell, used new carrier type transmit bandwidth is 10 MHz, and transmit time is the $1^{st}$ subframe and the $4^{th}$ subframe of each radio frame. After learning, by using, for example, an X2 interface, information about new carrier type transmit bandwidth and transmit time in the cell of the second base station, the current cell may configure new carrier type measurement bandwidth of the neighboring cell to be 10 MHz, and configure measurement time to be the $1^{st}$ subframe and the $4^{th}$ subframe of each radio frame.

Generally, the determined measurement time corresponding to the cell in which the user equipment is located may be the transmit time of the new carrier type cell-specific reference signal in the cell of the second base station; the determined measurement bandwidth corresponding to the cell in which the user equipment is located may be new carrier type transmit bandwidth in a cell of the first base station, or may be new carrier type transmit bandwidth in the cell of the second base station, where the measurement bandwidth may be determined according to an actual requirement. Using a smaller transmit bandwidth as the measurement bandwidth has less resource consumption and higher efficiency.

In addition, if the first base station receives transmit bandwidth and transmit time of new carrier type cell-specific reference signals from cells of multiple base stations, for a processing manner of transmit bandwidth and transmit time of a new carrier type cell-specific reference signal in a cell of each base station, reference may be made to the foregoing examples; in this case, the base station may transmit multiple pieces of measurement configuration information to the user equipment. This case may occur when a cell on which the user equipment currently camps has multiple neighboring cells. In this case, each pair of measurement bandwidth and measurement time may be used as one measurement configuration information unit; then, the user equipment may separately perform measurement according to each measurement configuration information unit, or may perform measurement by selecting some measurement configuration information units, which is not limited in this embodiment of the present invention.

103. Transmit measurement configuration information including the measurement bandwidth and the measurement time to the user equipment.

In the foregoing solution, a first base station acquires transmit bandwidth and transmit time of a new carrier type cell-specific reference signal in a cell of a second base station through an inter-base-station interface, and delivers, to UE, measurement configuration information including two pieces of information, namely, measurement bandwidth and measurement time, so that the first base station can obtain transmit bandwidth and transmit time of a CRS of a neighboring base station thereof (that is, the second base station) and the UE can perform accurate measurement on an NCT serving cell and an NCT neighboring cell. Therefore, a solution for performing effective measurement in a new carrier type is provided.

Optionally, the transmitting measurement configuration information including the measurement bandwidth and the measurement time to the user equipment in step 103 may include: if the user equipment is currently in a connected state, transmitting the measurement configuration information to the user equipment by using dedicated radio resource control signaling; or if the user equipment is currently in a non-connected state, transmitting the measurement configuration information to the user equipment by using a radio resource control broadcast message. In addition, if the user equipment is currently in the connected state, the base station may also transmit, by using an RRC broadcast message, the measurement configuration information including the measurement bandwidth and the measurement time to the user equipment. The foregoing provides three examples of methods for transmitting the measurement configuration information to the user equipment. It should be noted that the base station may also use many other solutions to transmit the measurement configuration information to the user equipment, and the foregoing examples are by no means an exhaustive list of all transmitting manners. Therefore, the foregoing examples should not be understood as a limitation on this embodiment of the present invention.

Further, this embodiment of the present invention further provides a reporting solution after the user equipment performs measurement, which is specifically as follows: the measurement configuration information further includes a reporting criterion; and after the transmitting measurement configuration information including the measurement bandwidth and the measurement time to the user equipment, the method may further include: receiving a measurement result that is reported by the user equipment according to the reporting criterion, and then performing mobility management on the user equipment according to the measurement result.

Optionally, a period of a subframe of the new carrier type cell-specific reference signal is 5 milliseconds, and the determined measurement time corresponding to the cell in which the user equipment is located may be starting time of the period of the subframe.

Figure 2:
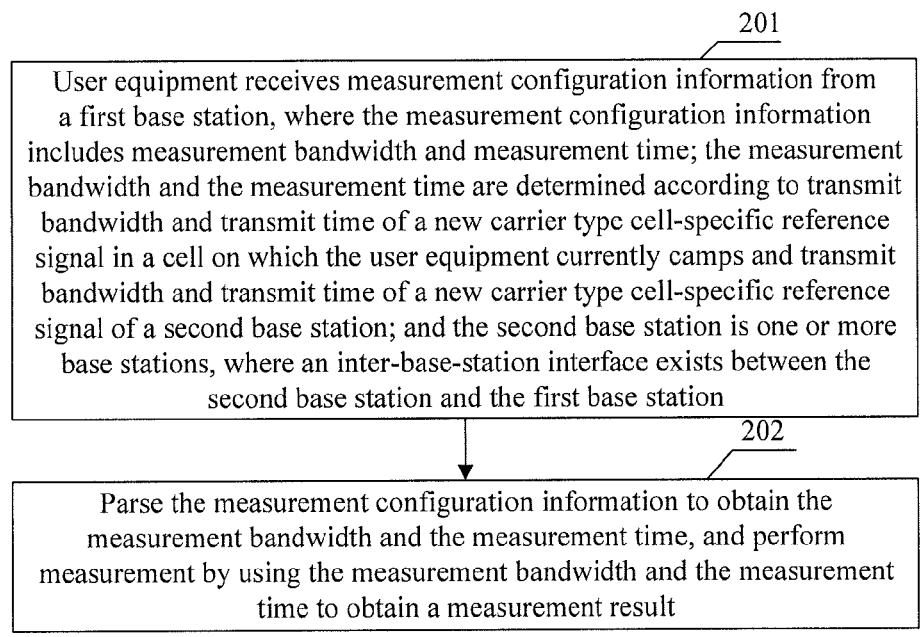
FIG. 2 is a schematic flowchart of a method according to an embodiment of the present invention.

An embodiment of the present invention further provides a measurement method, as shown in FIG. 2, including:

201. User equipment receives measurement configuration information from a first base station, where the measurement configuration information includes measurement bandwidth and measurement time; the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station; and the second base station is one or a plurality of base stations, where an inter-base-station interface exists between the second base station and the first base station.

For a specific solution for determining the measurement bandwidth and the measurement time that are included in the measurement configuration information in step 201, reference may be made to the determining solution of the first base station in the previous embodiment, and details are not described herein again. The user equipment may receive the measurement configuration information transmitted by the first base station. It can be understood that the cell on which the user equipment currently camps should belong to cells of the first base station.

Optionally, that user equipment receives measurement configuration information from a first base station in step 201 may include: when the user equipment is in a connected state, receiving the measurement configuration information by using dedicated radio resource control signaling; or when the user equipment is in a non-connected state, receiving the measurement configuration information by using a radio resource control broadcast message. In addition, the user equipment may also receive the measurement configuration information by using an RRC broadcast message if the user equipment is currently in the connected state. The foregoing provides three examples of methods for receiving the measurement configuration information. It should be noted that the user equipment may also use many other solutions to receive the measurement configuration information from the base station, and the foregoing examples are by no means an exhaustive list of all receiving manners. Therefore, the foregoing examples should not be understood as a limitation on this embodiment of the present invention.

202. Parse the measurement configuration information to obtain the measurement bandwidth and the measurement time, and perform measurement by using the measurement bandwidth and the measurement time to obtain a measurement result.

For example, the measurement configuration information is carried in an RRC broadcast message, which may be specifically as follows: after the user equipment receives an RRC broadcast message transmitted by the first base station, because the RRC broadcast message may be designed and transmitted strictly according to an air interface protocol, the user equipment may perform decoding on an RRC configuration message according to a related regulation of the air interface protocol after receiving the RRC broadcast message. More specifically, the user equipment may first remove a message header of the RRC broadcast message, and then extract the measurement configuration information from a position that is specified in the air interface protocol and in which the measurement configuration information exists.

After the measurement configuration information is extracted, the user equipment transmits the measurement configuration information to a physical layer of the user equipment. Because the measurement configuration information includes the measurement bandwidth and the measurement time that are required when the physical layer of the user equipment performs measurement, the physical layer of the user equipment may perform measurement on reference signals in a serving cell and a neighboring cell according to the measurement bandwidth and the measurement time, so as to obtain a measurement result.

In the foregoing solution, measurement configuration information received by user equipment includes two pieces of information, namely, measurement bandwidth and measurement time, and the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station, so that the UE can perform accurate measurement on an NCT serving cell and an NCT neighboring cell. Therefore, a solution for performing effective measurement in a new carrier type is provided.

Further, this embodiment of the present invention further provides a reporting solution after the user equipment performs measurement, where the reporting solution is as follows: the measurement configuration information further includes a reporting criterion; in this case, after the performing measurement by using the measurement bandwidth and the measurement time to obtain a measurement result in step 202, the method may further include: transmitting the measurement result to the first base station according to the reporting criterion in the measurement configuration information when the user equipment is in the connected state; or transmitting the measurement result to a radio resource control layer in the user equipment when the user equipment is in the non-connected state, where the measurement result is used for cell selection and cell reselection based on UE. The foregoing provides two examples for using the measurement result. It should be noted that there may be many other using solutions after the measurement result is obtained, and the measurement result may even be only stored and temporarily not used. The examples used above should not be understood as a limitation on this embodiment of the present invention.

Optionally, a period of a subframe of the new carrier type cell-specific reference signal is 5 milliseconds, and the measurement time included in the received measurement configuration information may be starting time of the period of the subframe.

Figure 3:
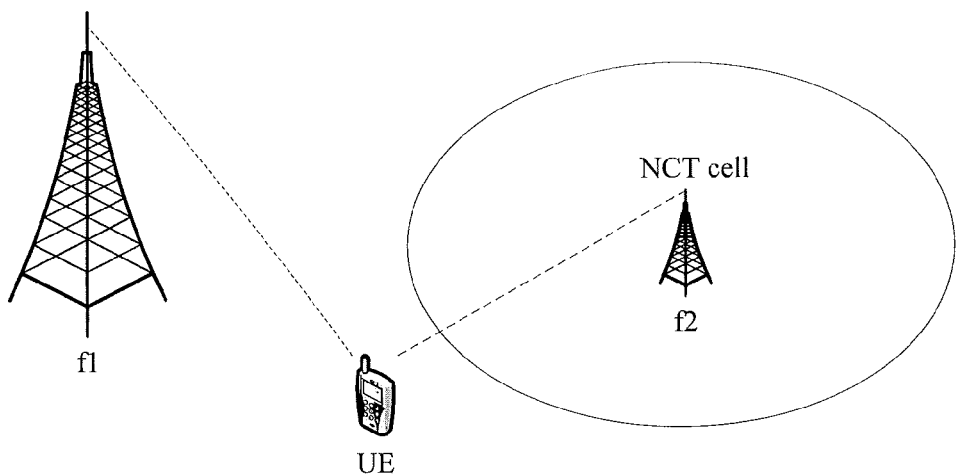
FIG. 3 is a schematic diagram of a system environment according to an embodiment of the present invention.

In the following embodiment, measurement performed by UE in a case in which an R8 carrier and an R12 carrier coexist is used as an example for description. Referring to a diagram of a system environment shown in FIG. 3, f1 is an R8 carrier, f2 is an NCT carrier, and UE may perform RRM measurement on an NCT cell over the NCT carrier.

Figure 4:
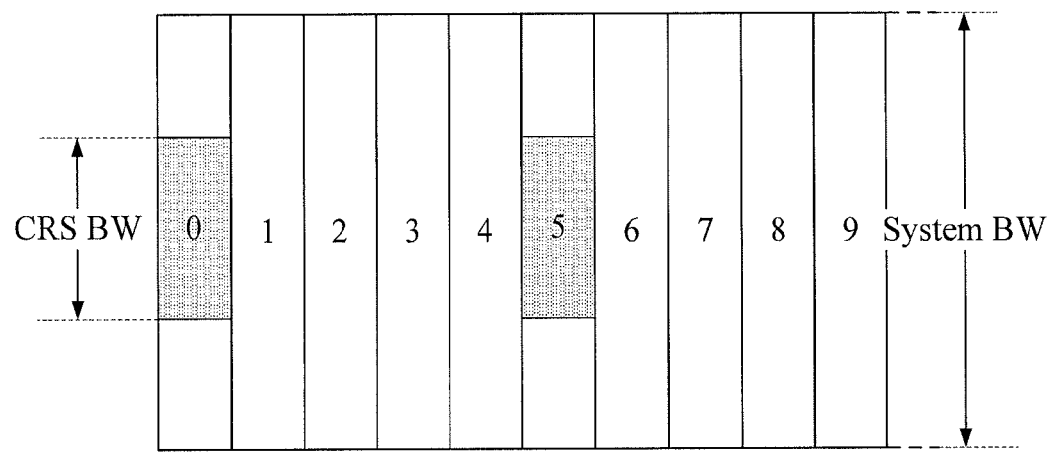
FIG. 4 is a schematic structural diagram of a subframe according to an embodiment of the present invention.
Figure 5:
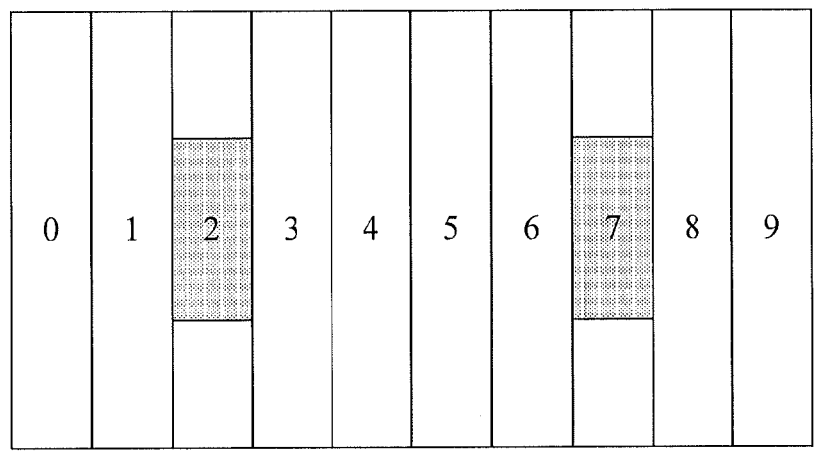
FIG. 5 is a schematic structural diagram of a subframe according to an embodiment of the present invention.

Transmit bandwidth of an NCT cell reference signal may be less than system bandwidth, as shown in FIG. 4 in which System BW (System Bandwidth) and CRS BW (cell-specific reference signal bandwidth) are shown. Ten subframes from 0 to 9 are included in FIG. 4, where subframe 0 and subframe 5 are used to transmit a CRS, and are positions filled by black dots, as shown in FIG. 4. It should be noted that both a quantity of subframes and a time domain or frequency domain position for transmitting a CRS can be set. As shown in FIG. 5, compared with FIG. 4, positions for transmitting a CRS are changed to subframe 2 and subframe 7. It can be seen from the foregoing that: specifically, f2 is an R12 NCT carrier, transmit bandwidth of an NCT cell-specific reference signal may be less than system bandwidth, and a transmitting period of a new carrier CRS is 5 ms.

In this embodiment of the present invention, in order to complete measurement, UE needs to be informed of information such as measurement bandwidth and measurement time. This embodiment of the present invention first briefly introduces sources, possibly used transmitting manners, and transmitting reasons of the measurement bandwidth and the measurement time, which are specifically as follows:

1. Measurement Bandwidth

Bandwidth of a CRS may be transmitted by an eNB (evolved NodeB) to a neighboring eNB through an X2 interface, and then transmitted by the neighboring eNB to UE through an air interface, and is used to assist the UE in measurement.

A network using an R8 protocol may transmit signaling AllowedMeasBandwidth to the UE to inform the UE of maximum measurement bandwidth that can be used. Typically, AllowedMeasBandwidth is a minimum value of system bandwidth of a neighboring cell of a current eNB. The signaling may be used for UE in a connected mode or in an idle mode.

In an NCT scenario, bandwidth of a CRS in an NCT cell may be less than the system bandwidth, but if the information can be exchanged between eNBs through an X2 interface, the current serving eNB can inform the UE of measurement bandwidth information of a serving cell and a neighboring cell by reusing the existing signaling Allowed-MeasBandwidth.

2. Measurement Time

Only a measurement period and a measurement precision requirement that are of UE are limited in an R8 protocol standard. For example, in a state in which DRX (Discontinuous Reception) is not configured, a measurement period of the UE for an intra-frequency neighboring cell is 200 ms, and a measurement result of the intra-frequency neighboring cell needs to satisfy the measurement precision requirement of ±6 dB. Typically, the UE may collect multiple measurement samples in the 200 ms measurement period, and then filters these measurement sample values to eliminate, as much as possible, measurement fluctuation caused by channel fading. However, that the UE specifically performs measurement sampling on which subframes depends on implementation by the UE and is not limited at all in the standard. Theoretically, the UE may perform sampling on any subframe within 200 ms.

In an NCT scenario, a problem may occur when an implementation manner of UE in an R8 protocol is used. Over an NCT carrier, a subframe is used to transmit a CRS every 5 ms; therefore, the UE can collect correct CRS measurement values by performing measurement sampling only in subframes in which a CRS is transmitted, such as positions for transmitting a CRS shown in FIG. 4 and FIG. 5. In order to resolve a problem that a correct CRS measurement value cannot be collected, in this embodiment of the present invention, the UE is informed of measurement time of the UE, that is, in which subframe in a period of 5 ms a CRS is first transmitted.

Figure 6:
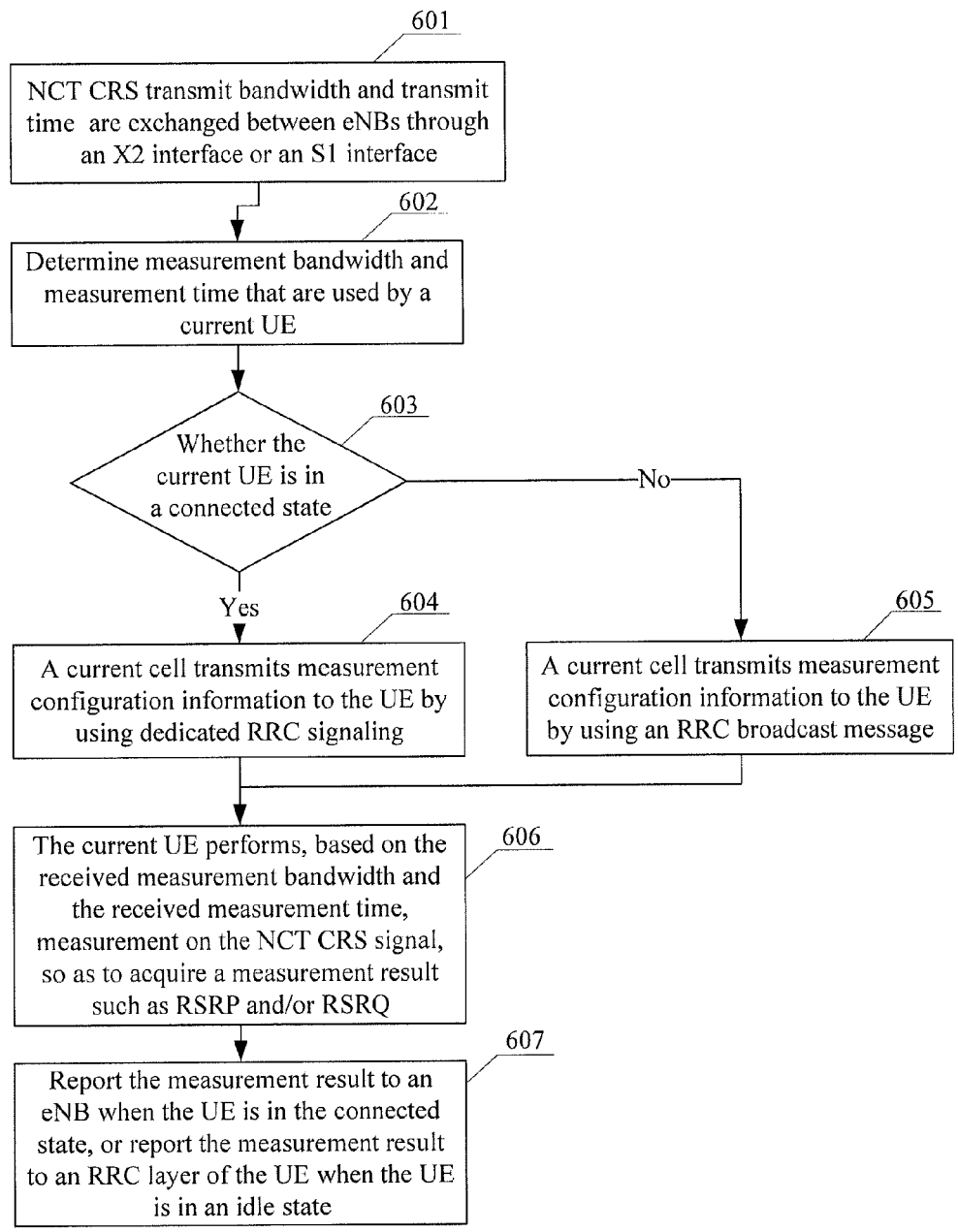
FIG. 6 is a schematic flowchart of a method according to an embodiment of the present invention.

In the following, based on the foregoing analysis of information that needs to be notified to UE, a more specific process is provided in this embodiment of the present invention, as shown in FIG. 6, including:

601. NCT CRS transmit bandwidth and transmit time are exchanged between eNBs through an X2 or S1 interface.

Specifically, after an LTE (Long Term Evolution) network is deployed, an eNB using an NCT informs, through an inter-eNB X2 interface, a neighboring eNB of NCT CRS transmit bandwidth and NCT CRS transmit time of the eNB. By means of step 601, for one an eNB, the eNB can learn NCT CRS transmit bandwidth and NCT CRS transmit time in a cell of a neighboring eNB of the eNB; in the entire LTE network, each eNB learns NCT CRS transmit bandwidth and NCT CRS transmit time in a cell of a neighboring eNB of the eNB.

Specifically, each eNB includes multiple cells, and cells of a same eNB are managed by a same eNB; therefore, an eNB can learn information about NCT CRS transmit bandwidth and transmit time in cells of the eNB. For cells of different eNBs, an inter-eNB X2 interface may be used to acquire information about NCT CRS transmit bandwidth and NCT CRS transmit time in a cell of another eNB.

602. When UE camping on a cell performs measurement on a neighboring cell, a current cell determines, with reference to NCT CRS transmit bandwidth and transmit time of a neighboring eNB, measurement bandwidth and measurement time that are used by the current UE.

Specifically, the cell on which the UE currently camps configures measurement configuration information of the current UE by using RRC signaling. The configured measurement configuration information may include measurement bandwidth and measurement time of an NCT CRS in a neighboring cell, and may further include other measurement configuration information.

603. Determine whether the current UE is in a connected state, and if yes, go to step 604; if no, go to step 605.

604. The current cell transmits measurement configuration information (including at least the measurement bandwidth and the measurement time) to the UE by using dedicated RRC signaling, and then go to step 606.

Because the current cell in which the UE is located can learn NCT CRS transmit bandwidth and transmit time in a neighboring cell in step 601, the current cell can determine, with reference to information about all neighboring cells that inform the UE of their NCT CRS transmit bandwidth and transmit time, NCT CRS measurement bandwidth and measurement time that are required by the UE to perform measurement.

605. The current cell transmits measurement configuration information (including at least the measurement bandwidth and the measurement time) to the UE by using an RRC broadcast message, and then go to step 606.

606. The current UE performs, based on the received measurement bandwidth and the received measurement time, measurement on an NCT CRS signal, so as to acquire a measurement result such as RSRP and/or RSRQ.

Specifically, after the UE receives, from a cell on which the UE currently camps, measurement configuration information delivered by an eNB, the UE parses out and extracts required NCT CRS measurement bandwidth and measurement time from a message including the measurement configuration information, and performs measurement on quality of service of a neighboring cell and/or a current serving cell according to the measurement bandwidth and the measurement time. Quality of service of a cell may be obtained by evaluating a physical-layer measurement quantity, such as RSRP, RSSI, or RSRQ, measured by the UE.

607. After obtaining the measurement result, when the UE is in the connected state, the UE reports the measurement result to the eNB according to a reporting criterion in the measurement configuration information, so as to perform mobility management of the UE; when the UE is in a non-connected state, the UE reports the measurement result to an RRC layer of the UE, so as to perform mobility management based on the UE, that is, cell selection or reselection, or the like.

In the foregoing solution, a base station acquires transmit bandwidth and transmit time of a new carrier type cell-specific reference signal in a cell of a neighboring base station through an inter-base-station interface, and delivers, to UE, measurement configuration information including two pieces of information, namely, measurement bandwidth and measurement time, so that the base station can obtain transmit bandwidth and transmit time of a CRS of the neighboring base station and the UE can perform accurate measurement on an NCT serving cell and an NCT neighboring cell. Therefore, a solution for performing effective measurement in a new carrier type is provided.

Figure 7:
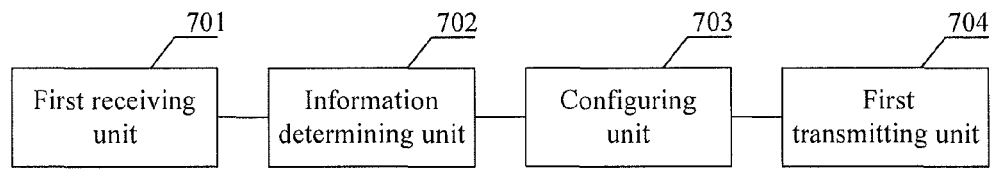
FIG. 7 is a schematic structural diagram of a base station according to an embodiment of the present invention.

An embodiment of the present invention further provides a base station, as shown in FIG. 7, including: a first receiving unit 701, an information determining unit 702, a configuring unit 703, and a first transmitting unit 704.

The first receiving unit 701 is configured to acquire transmit bandwidth and transmit time of a new carrier type cell-specific reference signal in a cell of a second base station through an inter-base-station interface, where the base station is a first base station, and the second base station is one or a plurality of base stations, where an inter-base-station interface exists between the second base station and the first base station.

For a specific method for acquiring, by the first receiving unit 701, the transmit bandwidth and the transmit time of the new carrier type cell-specific reference signal in the cell of the second base station, reference may be made to the description in the embodiment corresponding to FIG. 1, and details are not described herein again.

The information determining unit 702 is configured to determine, according to transmit bandwidth and transmit time of a new carrier type cell-specific reference signal in a cell of the first base station and the transmit bandwidth and the transmit time that are of the new carrier type cell-specific reference signal in the cell of the second base station and acquired by the first receiving unit 701, measurement bandwidth and measurement time corresponding to a cell in which user equipment is located.

For a specific method how the information determining unit 702 determines the measurement bandwidth and the measurement time corresponding to the cell in which the user equipment is located, reference may be made to the description in the embodiment corresponding to FIG. 1, and details are not described herein again.

The configuring unit 703 is configured to configure measurement configuration information including the measurement bandwidth and the measurement time that are determined by the information determining unit 702. A configuration process may be adding the measurement bandwidth and the measurement time to a message in which the measurement configuration information exists, and there are many specific configuration solutions; details are not described again in this embodiment of the present invention.

The first transmitting unit 704 is configured to transmit the measurement configuration information configured by the configuring unit 703 to the user equipment. Exemplary description of several specific transmitting solutions is further to be provided in subsequent embodiments.

In the foregoing solution, a first base station acquires transmit bandwidth and transmit time of a new carrier type cell-specific reference signal in a cell of a second base station through an inter-base-station interface, and delivers, to UE, measurement configuration information including two pieces of information, namely, measurement bandwidth and measurement time, so that the first base station can obtain transmit bandwidth and transmit time of a CRS of a neighboring base station and the UE can perform accurate measurement on an NCT serving cell and an NCT neighboring cell. Therefore, a solution for performing effective measurement in a new carrier type is provided.

Optionally, this embodiment of the present invention further provides a specific exemplary transmitting solution of the first transmitting unit 704, which is as follows: the first transmitting unit 704 may be specifically configured to: if the user equipment is currently in a connected state, transmit the measurement configuration information to the user equipment by using dedicated radio resource control signaling; or if the user equipment is currently in a non-connected state, transmit the measurement configuration information to the user equipment by using a radio resource control broadcast message. In addition, if the user equipment is currently in the connected state, the first transmitting unit 704 may also transmit, by using an RRC broadcast message, the measurement configuration information including the measurement bandwidth and the measurement time to the user equipment. The foregoing provides three examples of solutions for transmitting the measurement configuration information to the user equipment. It should be noted that the first transmitting unit 704 of the base station may also use many other solutions to transmit the measurement configuration information to the user equipment, and the foregoing examples are by no means an exhaustive list of all transmitting manners. Therefore, the foregoing examples should not be construed as a limitation on this embodiment of the present invention.

Figure 8:
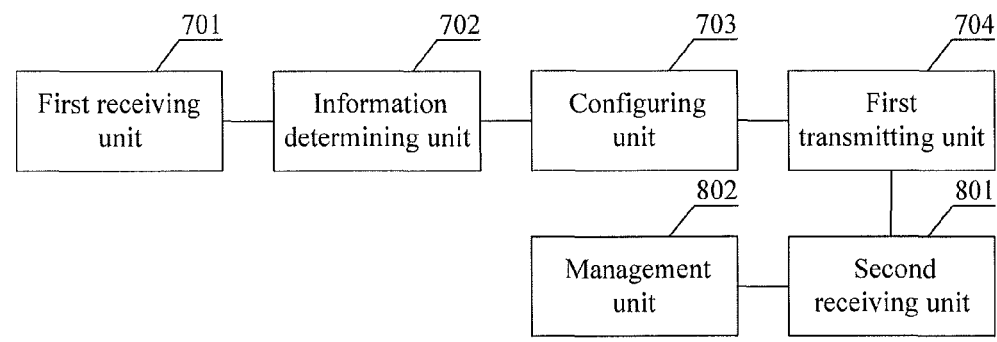
FIG. 8 is a schematic structural diagram of a base station according to an embodiment of the present invention.

Further, this embodiment of the present invention further provides a reporting solution after the user equipment performs measurement. As shown in FIG. 8, the configuring unit 703 may be further configured to configure a reporting criterion in the measurement configuration information. The base station may further include:

a second receiving unit 801, configured to: after the first transmitting unit 704 transmits the measurement configuration information including the measurement bandwidth and the measurement time to the user equipment that is in the connected state, receive a measurement result that is reported by the user equipment according to the reporting criterion; and a management unit 802, configured to perform, according to the measurement result received by the second receiving unit 801, mobility management on the user equipment that is in the connected state.

Optionally, a period of a subframe of the new carrier type cell-specific reference signal is 5 milliseconds, and the measurement time that is determined by the information determining unit 702 and corresponding to the cell in which the user equipment is located is starting time of the period of the subframe.

Figure 9:
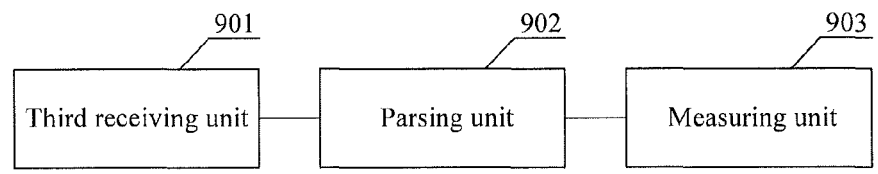
FIG. 9 is a schematic structural diagram of user equipment according to an embodiment of the present invention.

An embodiment of the present invention further provides user equipment, as shown in FIG. 9, including a third receiving unit 901, a parsing unit 902, and a measuring unit 903.

The third receiving unit 901 is configured to receive measurement configuration information from a first base station, where the measurement configuration information includes measurement bandwidth and measurement time; the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station, where the second base station is one or a plurality of base stations, and an inter-base-station interface exists between the second base station and the first base station.

For a specific solution for determining the measurement bandwidth and the measurement time that are included in the measurement configuration information, reference may be made to the determining solution of the first base station in the previous embodiment, and details are not described herein again. The user equipment may receive the measurement configuration information transmitted by the first base station. It can be understood that the cell on which the user equipment currently camps should belong to cells of the first base station.

The parsing unit 902 is configured to parse the measurement configuration information received by the third receiving unit 901 to obtain the measurement bandwidth and the measurement time.

The measuring unit 903 is configured to perform measurement by using the measurement bandwidth and the measurement time that are parsed out by the parsing unit 902, to obtain a measurement result.

For a specific parsing solution of the parsing unit 902 and a specific measurement solution of the measuring unit 903, reference may be made to the embodiment corresponding to FIG. 2, and details are not described herein again.

In the foregoing solution, measurement configuration information received by user equipment includes two pieces of information, namely, measurement bandwidth and measurement time, and the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station, so that the UE can perform accurate measurement on an NCT serving cell and an NCT neighboring cell. Therefore, a solution for performing effective measurement in a new carrier type is provided.

Optionally, the third receiving unit 901 may be specifically configured to: when the user equipment is in a connected state, receive the measurement configuration information by using dedicated radio resource control signaling; or the third receiving unit 901 may be specifically configured to: when the user equipment is in a non-connected state, receive the measurement configuration information by using a radio resource control broadcast message.

In addition, if the user equipment is currently in the connected state, the third receiving unit 901 may also receive the measurement configuration information by using an RRC broadcast message. The foregoing provides three examples of methods for receiving the measurement configuration information. It should be noted that the third receiving unit 901 may also use many other solutions to receive the measurement configuration information from the base station, and the foregoing examples are by no means an exhaustive list of all receiving manners. Therefore, the foregoing examples should not be construed as a limitation on this embodiment of the present invention.

Figure 10:
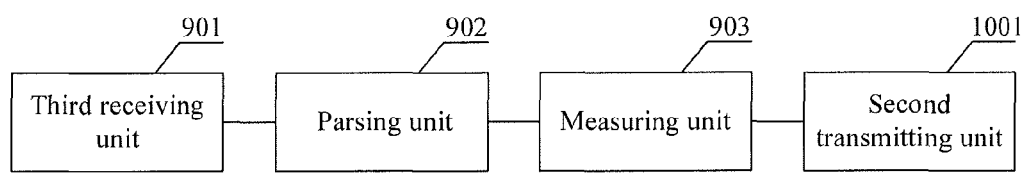
FIG. 10 is a schematic structural diagram of user equipment according to an embodiment of the present invention.

Optionally, this embodiment of the present invention further provides a reporting solution after the user equipment performs measurement. As shown in FIG. 10, the measurement configuration information received by the third receiving unit 901 further includes a reporting criterion.

The parsing unit 902 is further configured to parse the measurement configuration information to obtain the reporting criterion.

The user equipment further includes:

a second transmitting unit 1001, configured to: after the measuring unit 903 performs measurement by using the measurement bandwidth and the measurement time to obtain the measurement result, transmit the measurement result to the first base station according to the reporting criterion in the measurement configuration information when the user equipment is in the connected state, or transmit the measurement result to a radio resource control layer in the user equipment when the UE is in the non-connected state. The foregoing provides two examples for using the measurement result. It should be noted that there may be many other using solutions after the measurement result is obtained, and the measurement result may even be only stored and temporarily not used. The examples used above should not be construed as a limitation on this embodiment of the present invention.

Optionally, a period of a subframe of the new carrier type cell-specific reference signal is 5 milliseconds, and the measuring unit 903 may be specifically configured to perform measurement by using starting time of the period of the subframe as the measurement time.

Figure 11:
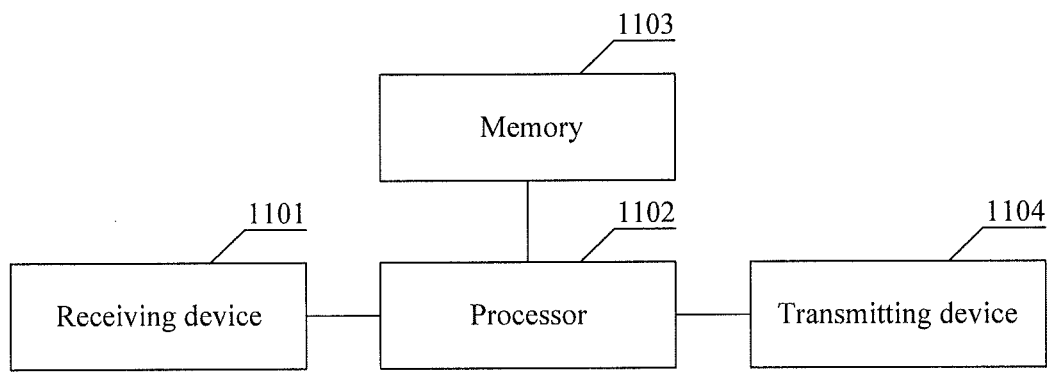
FIG. 11 is a schematic structural diagram of a base station according to an embodiment of the present invention.

An embodiment of the present invention further provides a base station, as shown in FIG. 11, including: a receiving device 1101, a processor 1102, a memory 1103, and a transmitting device 1104, where the base station is a first base station.

The receiving device 1101 is configured to acquire transmit bandwidth and transmit time of a new carrier type cell-specific reference signal in a cell of a second base station through an inter-base-station interface, where the second base station is one or a plurality of base stations, and an inter-base-station interface exists between the second base station and the first base station.

The processor 1102 is configured to: determine, according to transmit bandwidth and transmit time of a new carrier type cell-specific reference signal in a cell of the first base station and the transmit bandwidth and the transmit time that are of the new carrier type cell-specific reference signal in the cell of the second base station and received by the receiving device 1101, measurement bandwidth and measurement time corresponding to a cell in which user equipment is located; and instruct the transmitting device 1104 to transmit measurement configuration information including the measurement bandwidth and the measurement time to the user equipment.

For specific implementation of the foregoing solution, reference may be made to the specific method description in the embodiment corresponding to FIG. 1, and details are not described herein again.

In the foregoing solution, a first base station acquires transmit bandwidth and transmit time of a new carrier type cell-specific reference signal in a cell of a second base station through an inter-base-station interface, and delivers, to UE, measurement configuration information including two pieces of information, namely, measurement bandwidth and measurement time, so that the first base station can obtain transmit bandwidth and transmit time of a CRS of a neighboring base station and the UE can perform accurate measurement on an NCT serving cell and an NCT neighboring cell. Therefore, a solution for performing effective measurement in a new carrier type is provided.

Optionally, that the processor 1102 is configured to instruct the transmitting device 1104 to transmit the measurement configuration information including the measurement bandwidth and the measurement time to the user equipment includes that: the processor 1102 is configured to: if the user equipment is currently in a connected state, instruct the transmitting device 1104 to transmit the measurement configuration information to the user equipment by using dedicated radio resource control signaling; or if the user equipment is currently in a non-connected state, instruct the transmitting device 1104 to transmit the measurement configuration information to the user equipment by using a radio resource control broadcast message.

In addition, if the user equipment is currently in the connected state, the transmitting device 1104 may also transmit, by using an RRC broadcast message, the measurement configuration information including the measurement bandwidth and the measurement time to the user equipment. The foregoing provides three examples of solutions for transmitting the measurement configuration information to the user equipment. It should be noted that the transmitting device 1104 of the base station may also use many other solutions to transmit the measurement configuration information to the user equipment, and the foregoing examples are by no means an exhaustive list of all transmitting manners. Therefore, the foregoing examples should not be construed as a limitation on this embodiment of the present invention.

Further, the processor 1102 is further configured to add a reporting criterion to the measurement configuration information.

The receiving device 1101 is further configured to: after the processor 1102 instructs the transmitting device 1104 to transmit the measurement configuration information to the user equipment, receive a measurement result that is reported by the user equipment according to the reporting criterion.

The processor 1102 is further configured to perform mobility management on the user equipment according to the measurement result received by the receiving device 1101.

Optionally, a period of a subframe of the new carrier type cell-specific reference signal is 5 milliseconds, and the measurement time that is transmitted by the transmitting device 1104 by being instructed by the processor 1102 and that is corresponding to the cell in which the user equipment is located is starting time of the period of the subframe.

Figure 12:
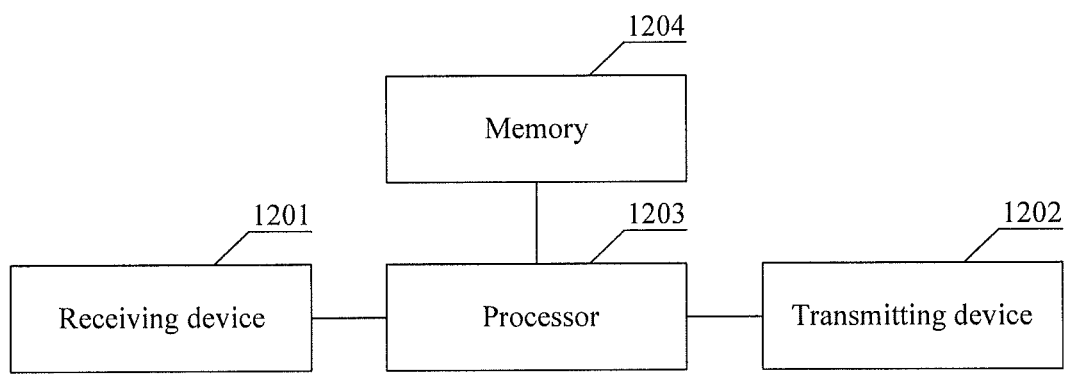
FIG. 12 is a schematic structural diagram of user equipment according to an embodiment of the present invention.

An embodiment of the present invention further provides user equipment, as shown in FIG. 12, including: a receiving device 1201, a transmitting device 1202, a processor 1203, and a memory 1204.

The receiving device 1201 is configured to receive measurement configuration information from a first base station, where the measurement configuration information includes measurement bandwidth and measurement time; the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station.

The processor 1203 is configured to parse the measurement configuration information received by the receiving device 1201 to obtain the measurement bandwidth and the measurement time, and perform measurement by using the measurement bandwidth and the measurement time to obtain a measurement result. The second base station is one or a plurality of base stations, where an inter-base-station interface exists between the second base station and the first base station.

For a specific solution for determining the measurement bandwidth and the measurement time that are included in the measurement configuration information, reference may be made to the determining solution of the first base station in the previous embodiment, and details are not described herein again. The user equipment may receive the measurement configuration information transmitted by the first base station. It can be understood that the cell on which the user equipment currently camps should belong to cells of the first base station.

In the foregoing solution, measurement configuration information received by user equipment includes two pieces of information, namely, measurement bandwidth and measurement time, and the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station, so that the UE can perform accurate measurement on an NCT serving cell and an NCT neighboring cell. Therefore, a solution for performing effective measurement in a new carrier type is provided.

Optionally, the receiving device 1201 is specifically configured to: when the user equipment is in a connected state, receive the measurement configuration information by using dedicated radio resource control signaling; or the receiving device 1201 is specifically configured to: when the user equipment is in a non-connected state, receive the measurement configuration information by using a radio resource control broadcast message.

In addition, if the user equipment is currently in the connected state, the receiving device 1201 may also receive the measurement configuration information by using an RRC broadcast message. The foregoing provides three examples of methods for receiving the measurement configuration information. It should be noted that the receiving device 1201 may also use many other solutions to receive the measurement configuration information from the base station, and the foregoing examples are by no means an exhaustive list of all receiving manners. Therefore, the foregoing examples should not be construed as a limitation on this embodiment of the present invention.

Further, this embodiment of the present invention further provides a reporting solution after the user equipment performs measurement. The measurement configuration information received by the receiving device 1201 further includes a reporting criterion.

The processor 1203 is further configured to: after performing measurement by using the measurement bandwidth and the measurement time to obtain the measurement result, instruct the transmitting device 1202 to transmit the measurement result to the first base station according to the reporting criterion in the measurement configuration information when the user equipment is in the connected state, or instruct the transmitting device 1202 to transmit the measurement result to a radio resource control layer in the user equipment when the user equipment is in the non-connected state. The foregoing provides two examples for using the measurement result. It should be noted that there may be many other using solutions after the measurement result is obtained, and the measurement result may even be only stored and temporarily not used. The examples used above should not be construed as a limitation on this embodiment of the present invention.

Optionally, a period of a subframe of the new carrier type cell-specific reference signal is 5 milliseconds, and the processor 1203 performs measurement by using starting time of the period of the subframe as the measurement time.

Figure 13:
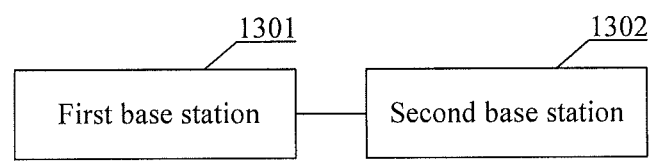
FIG. 13 is a schematic structural diagram of a system according to an embodiment of the present invention.

An embodiment of the present invention further provides a mobile communications system, including: a first base station 1301 and a second base station 1302, as shown in FIG. 13.

The first base station 1301 is the first base station 1301 according to any one of the embodiments of the present invention. The second base station 1302 is one or a plurality of base stations, where an inter-base-station interface exists between the second base station 1302 and the first base station 1301.

In the foregoing solution, a first base station acquires transmit bandwidth and transmit time of a new carrier type cell-specific reference signal in a cell of a second base station through an inter-base-station interface, and delivers, to UE, measurement configuration information including two pieces of information, namely, measurement bandwidth and measurement time, so that the first base station can obtain transmit bandwidth and transmit time of a CRS of a neighboring base station and the UE can perform accurate measurement on an NCT serving cell and an NCT neighboring cell. Therefore, a solution for performing effective measurement in a new carrier type is provided.

It should be noted that: a quantity of base stations shown in FIG. 13 is three, a quantity of base stations in an actual network may be unlimited, and either a quantity of first base stations 1301 or a quantity of second base stations 1302 needs to be greater than or equal to one. Therefore, the quantity of base stations in FIG. 13 should not be construed as a limitation on this embodiment of the present invention.

Figure 14:
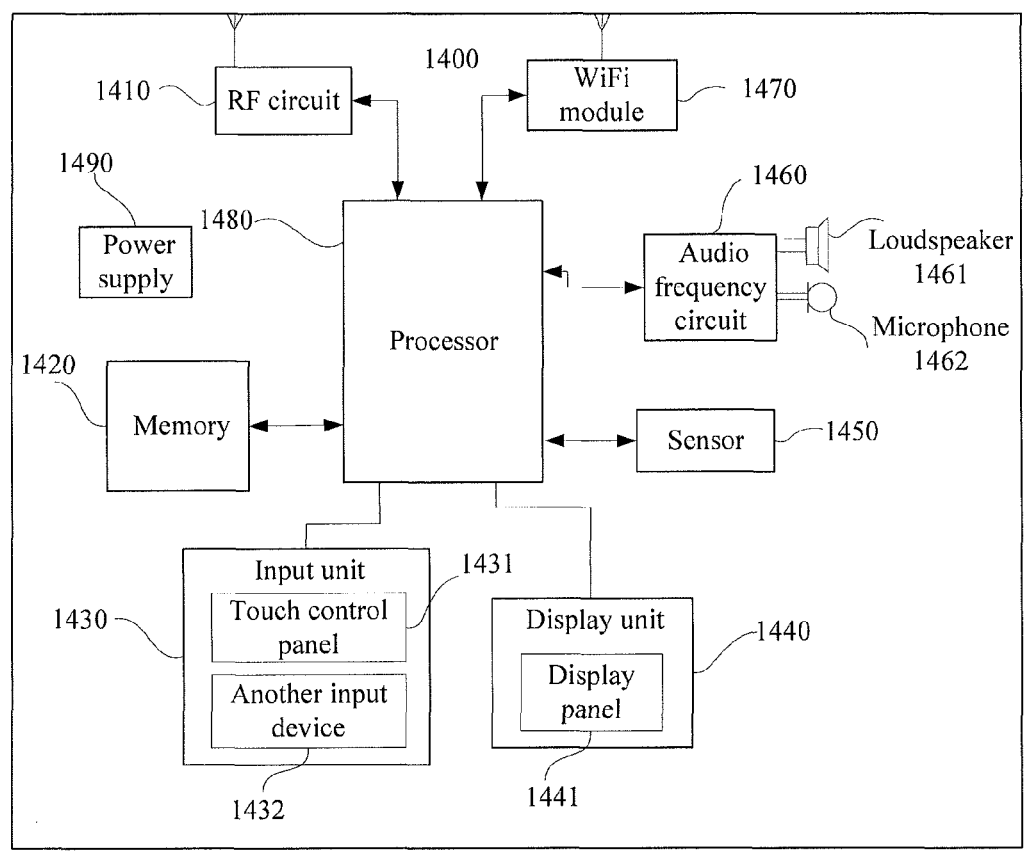
FIG. 14 is a schematic structural diagram of a mobile phone according to an embodiment of the present invention.

FIG. 14 shows a structure of user equipment according to an embodiment of the present invention. The user equipment according to this embodiment of the present invention may be configured to implement the methods according to the embodiments of the present invention. For ease of description, only a part related to this embodiment of the present invention is shown, and for unrevealed specific technical details, refer to the method parts of the embodiments of the present invention.

The user equipment may be a terminal device including a mobile phone, a tablet computer, a PDA (Personal Digital Assistant), POS (Point of Sale), a vehicle-mounted computer, or the like. Using an example in which the user equipment is a mobile phone, FIG. 14 shows a block diagram of a partial structure of a mobile phone 1400 related to the user equipment according to this embodiment of the present invention. Referring to FIG. 14, the mobile phone 1400 includes components such as an RF (Radio Frequency) circuit 1410, a memory 1420, an input unit 1430, a display unit 1440, a sensor 1450, an audio frequency circuit 1460, a WiFi (wireless fidelity) module 1470, a processor 1480, and a power supply 1490. A person skilled in the art may understand that the structure of the mobile phone structure in FIG. 14 does not impose any limitation on the mobile phone, and the mobile phone may include more or less components than those shown in the diagram, or some components may be combined, or components may be differently arranged.

The following introduces in detail each component of the mobile phone 1400 with reference to FIG. 14.

The RF circuit 1410 may be configured to: receive and transmit a signal in a message receiving and transmitting process or in a call process, and especially, receive downlink information of a base station for the processor 1480 to perform processing; in addition, transmit designed uplink data to the base station. Generally, the RF circuit includes but is not limited to an antenna, at least one amplifier, a transceiver, a coupler, an LNA (Low Noise Amplifier), a duplexer, and the like. Moreover, the RF circuit 1410 may further communicate with a network and another device by means of radio communications. The radio communications may use any communications standard or protocol, including but not limited to GSM (Global System for Mobile communications), GPRS (General Packet Radio Service), CDMA (Code Division Multiple Access), WCDMA (Wideband Code Division Multiple Access), LTE (Long Term Evolution), LTE-Advanced (Long Term Evolution Advanced), Email, SMS (Short Message Service), and the like.

The memory 1420 may be configured to store a software program and module. The processor 1480 executes, by running the software program and module stored in the memory 1420, various functional applications of the mobile phone 1400 and processes data. The memory 1420 may mainly include a program storage area and a data storage area, where the program storage area may store an operating system, at least one application program required by a function (such as a voice playback function or an image playback function), and the like; the data storage area may store data (such as audio data and a phone book) created according to use of the mobile phone 1400, and the like. Moreover, the memory 1420 may include a high-speed random access memory, and may further include a nonvolatile memory, such as at least one magnetic disk storage, a flash memory, or another volatile solid-state storage.

The input unit 1430 may be configured to: receive input number or character information, and generate key signal input related to user setting and function control of the mobile phone 1400. Specifically, the input unit 1430 may include a touch control panel 1431 and another input device 1432. The touch control panel 1431, also referred to as a touchscreen, may collect a touch operation of a user on or near the touch control panel 1431 (for example, an operation of a user on the touch control panel 1431 or near the touch control panel 1431 by using any suitable object or accessory such as a finger or a stylus), and drive a corresponding connection apparatus according to a preset program. Optionally, the touch control panel 1431 may include two parts: a touch detection apparatus and a touch controller. The touch detection apparatus detects a touch position of the user, detects a signal brought by the touch operation, and transmits the signal to the touch controller; the touch controller receives touch information from the touch detection apparatus, converts the touch information into touch point coordinates, and transmits the touch point coordinates to the processor 1480, and can receive and execute a command transmitted by the processor 1480. Moreover, the touch control panel 1431 may be implemented by using various types such as a resistive type, a capacitive type, an infrared type, and a surface acoustic wave type. In addition to the touch control panel 1431, the input unit 1430 may further include the another input device 1432. Specifically, the another input device 1432 may include but is not limited to one or more of a physical keyboard, a function key (such as a volume control button or a power on/off button), a trackball, a mouse, a joystick, and the like.

The display unit 1440 may be configured to display information that is input by the user or information that is provided for the user, and various menus of the mobile phone 1400. The display unit 1440 may include a display panel 1441. Optionally, the display panel 1441 may be configured in various forms such as an LCD (Liquid Crystal Display) and an OLED (Organic Light-Emitting Diode). Further, the touch control panel 1431 can cover the display panel 1441. When the touch control panel 1431 detects the touch operation on or near the touch control panel 1431, information about the touch operation is transmitted to the processor 1480 to determine a type of a touch event, and then the processor 1480 provides corresponding visual output on the display panel 1441 according to the type of the touch event. Although the touch control panel 1431 and the display panel 1441 implement input and output functions of the mobile phone 1400 as two separate components in FIG. 14, in some embodiments, the touch control panel 1431 and the display panel 1441 may be integrated to implement the input and output functions of the mobile phone 1400.

The mobile phone 1400 may further include at least one sensor 1450, such as a light sensor, a motion sensor, and another sensor. Specifically, the light sensor may include an ambient light sensor and a proximity sensor, where the ambient light sensor may adjust brightness of the display panel 1441 according to intensity of ambient light rays; the proximity sensor may shut down the display panel 1441 and/or backlight when the mobile phone 1400 is moved to the proximity of an ear. As a type of motion sensor, an accelerometer sensor can detect an acceleration value in each direction (generally in three axes), and can detect a gravity value and direction when staying still, which may be used for an application for recognizing a posture of the mobile phone (for example, landscape and portrait switching, relevant games, magnetometer posture calibration), vibration recognition relevant functions (for example, a pedometer and a strike), and the like. Other sensors such as a gyroscope, a barometer, a hygrometer, a thermometer, and an infrared sensor may be further configured for the mobile phone 1400, and details are not described herein again.

The audio frequency circuit 1460, a loudspeaker 1461, and a microphone 1462 may provide an audio interface between the user and the mobile phone 1400. The audio frequency circuit 1460 can receive audio data, convert the audio data into an electric signal, and transmit the electric signal to the loudspeaker 1461, and the loudspeaker 1461 converts the electric signal into a voice signal for output. On the other hand, the microphone 1462 converts the collected voice signal into an electric signal, the audio frequency circuit 1460 receives and converts the electric signal into audio data and outputs the audio data to the processor 1480 for processing, and then the processor 1480 transmits the audio data to, for example, another mobile phone by using the RF circuit 1410, or outputs the audio data to the memory 1420 for further processing.

WiFi belongs to a short-range wireless transmission technology. The mobile phone 1400 may help, by using the WiFi module 1470, the user to receive and send emails, browse a web page, gain access to streaming media, and the like. WiFi provides wireless broadband Internet access for the user. Although the WiFi module 1470 is shown in FIG. 14, it can be understood that the WiFi module 1470 is not an essential part of the mobile phone 1400 and may be completely omitted according to a requirement without changing the essence of the invention.

The processor 1480 is a control center of the mobile phone 1400, connects all parts of the entire mobile phone by using various interfaces and circuits, and executes various functions of the mobile phone 1400 by running or executing the software program and/or module stored in the memory 1420 and processes data by invoking data stored in the memory 1420, so as to perform overall monitoring on the mobile phone. Optionally, the processor 1480 may include one or more processing units. Preferably, the processor 1480 may be formed by integrating an application processor and a modem processor, where the application processor mainly processes an operating system, a user interface, an application program, and the like, and the modem processor mainly processes radio communications. It can be understood that the modem processor may not be integrated in the processor 1480.

The mobile phone 1400 further includes the power supply 1490 (such as a battery) that provides power for all components. Preferably, the power supply may be logically connected to the processor 1480 by using a power management system, so as to implement, by using the power management system, functions, such as charging management, discharging management, and power consumption management.

The mobile phone 1400 may further include a camera, a Bluetooth module, and the like, although not shown; details are not described herein again.

In this embodiment of the present invention, the processor 1480 and related receiving functional modules included in the user equipment may further have the following functions:

The WiFi module 1470 or the RF circuit 1410 is configured to receive measurement configuration information from a first base station, where the measurement configuration information includes measurement bandwidth and measurement time; the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station.

The processor 1480 is configured to parse the measurement configuration information received by the WiFi module 1470 or the RF circuit 1410 to obtain the measurement bandwidth and the measurement time, and perform measurement by using the measurement bandwidth and the measurement time to obtain a measurement result. The second base station is one or a plurality of base stations, where an inter-base-station interface exists between the second base station and the first base station.

For a specific solution for determining the measurement bandwidth and the measurement time that are included in the measurement configuration information, reference may be made to the determining solution of the first base station in the previous embodiment, and details are not described herein again. The user equipment may receive the measurement configuration information transmitted by the first base station. It can be understood that the cell on which the user equipment currently camps should belong to cells of the first base station.

In the foregoing solution, measurement configuration information received by user equipment includes two pieces of information, namely, measurement bandwidth and measurement time, and the measurement bandwidth and the measurement time are determined according to transmit bandwidth and transmit time of a new carrier type cell-specific reference signal in a cell on which the user equipment currently camps and transmit bandwidth and transmit time of a new carrier type cell-specific reference signal of a second base station, so that the UE can perform accurate measurement on an NCT serving cell and an NCT neighboring cell. Therefore, a solution for performing effective measurement in a new carrier type is provided.

Optionally, the WiFi module 1470 or the RF circuit 1410 is configured to: when the user equipment is in a connected state, receive the measurement configuration information by using dedicated radio resource control signaling; or the WiFi module 1470 or the RF circuit 1410 is configured to: when the user equipment is in a non-connected state, receive the measurement configuration information by using a radio resource control broadcast message.

In addition, if the user equipment is currently in the connected state, the WiFi module 1470 or the RF circuit 1410 may also receive the measurement configuration information by using an RRC broadcast message. The foregoing provides three examples of methods for receiving the measurement configuration information. It should be noted that the WiFi module 1470 or the RF circuit 1410 may also use many other solutions to receive the measurement configuration information from the base station, and the foregoing examples are by no means an exhaustive list of all receiving manners. Therefore, the foregoing examples should not be construed as a limitation on this embodiment of the present invention.

Further, this embodiment of the present invention further provides a reporting solution after the user equipment performs measurement. The measurement configuration information received by the WiFi module 1470 or the RF circuit 1410 further includes a reporting criterion.

The processor 1480 is further configured to: after performing measurement by using the measurement bandwidth and the measurement time to obtain the measurement result, instruct the WiFi module 1470 or the RF circuit 1410 to transmit the measurement result to the first base station according to the reporting criterion in the measurement configuration information when the user equipment is in the connected state, or transmit the measurement result to a radio resource control layer in the user equipment when the user equipment is in the non-connected state. The foregoing provides two examples for using the measurement result. It should be noted that there may be many other using solutions after the measurement result is obtained, and the measurement result may even be only stored and temporarily not used. The examples used above should not be construed as a limitation on this embodiment of the present invention.

Optionally, a period of a subframe of the new carrier type cell-specific reference signal is 5 milliseconds, and the processor 1480 performs measurement by using starting time of the period of the subframe as the measurement time.

It should be noted that, the base station division is merely logical function division, but is not limited to the foregoing division, as long as corresponding functions can be implemented. In addition, specific names of the functional units are merely provided for the purpose of distinguishing the units from one another, but are not intended to limit the protection scope of the present invention.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A measurement method, comprising:
   acquiring, by a first base station, transmit bandwidth and transmit time of a new carrier type cell-specific reference signal in a cell of a second base station through an inter-base-station interface, wherein the second base station is one or a plurality of base stations, and an wherein the inter-base-station interface exists between the second base station and the first base station;
   determining, according to:
      a transmit bandwidth of a new carrier type cell-specific reference signal in a cell of the first base station;
      a transmit time of the new carrier type cell-specific reference signal in the cell of the first base station;
      the transmit bandwidth of the new carrier type cell-specific reference signal in the cell of the second base station; and
      the transmit time of the new carrier type cell-specific reference signal in the cell of the second base station,
   measurement bandwidth and measurement time corresponding to a cell in which user equipment is located; and
   transmitting measurement configuration information comprising the measurement bandwidth and the measurement time to the user equipment.

2. The method according to claim 1, wherein the transmitting measurement configuration information comprising the measurement bandwidth and the measurement time to the user equipment comprises:
   while the user equipment is currently in a connected state, transmitting, by using dedicated radio resource control signaling, the measurement configuration information comprising the measurement bandwidth and the measurement time to the user equipment; and
   while the user equipment is currently in a non-connected state, transmitting, by using a radio resource control broadcast message, the measurement configuration information comprising the measurement bandwidth and the measurement time to the user equipment.

3. The method according to claim 1, wherein:
   a period of a subframe of the new carrier type cell-specific reference signal is 5 milliseconds, and
   the determined measurement time corresponding to the cell in which the user equipment is located is starting time of the period of the subframe.

4. A measurement method, comprising:
   receiving, by user equipment, measurement configuration information from a first base station, wherein:
      the measurement configuration information comprises measurement bandwidth and measurement; time,
      the measurement bandwidth and the measurement time are determined according to transmit bandwidth of a new carrier type cell-specific reference signal in a cell on which the user equipment is currently located, transmit time of the new carrier type cell-specific reference signal in the cell on which the user equipment is currently located, transmit bandwidth of a new carrier type cell-specific reference signal of a second base station, and transmit time of the new carrier type cell-specific reference signal of the second base station,
      the second base station is one or a plurality of base stations, and
      an inter-base-station interface exists between the second base station and the first base station; and
   parsing the measurement configuration information to obtain the measurement bandwidth and the measurement time; and
   performing measurement by using the measurement bandwidth and the measurement time to obtain a measurement result.

5. The method according to claim 4, wherein the receiving, by user equipment, measurement configuration information from the first base station comprises:
   while the user equipment is in a connected state, receiving the measurement configuration information by using dedicated radio resource control signaling; and
   while the user equipment is in a non-connected state, receiving the measurement configuration information by using a radio resource control broadcast message.

6. The method according to claim 4, wherein:
a period of a subframe of the new carrier type cell-specific reference signal is 5 milliseconds, and
the measurement time comprised in the received measurement configuration information is starting time of the period of the subframe.

7. A base station, comprising:
at least one memory storing instructions; and
at least one hardware processor to execute the instructions within the at least one memory to implement:
acquiring transmit bandwidth and transmit time of a new carrier type cell-specific reference signal in a cell of a second base station through an inter-base-station interface, wherein the base station is a first base station, and the second base station is one or a plurality of base stations, wherein the inter-base-station interface exists between the second base station and the first base station;
determining, according to:
a transmit bandwidth of a new carrier type cell-specific reference signal in a cell of the first base station;
a transmit time of the new carrier type cell-specific reference signal in the cell of the first base station;
the transmit bandwidth of the new carrier type cell-specific reference signal in the cell of the second base station, and
the transmit time that are of the new carrier type cell-specific reference signal in the cell of the second base station and acquired by the first receiving unit,
measurement bandwidth and measurement time corresponding to a cell in which user equipment is located;
configuring measurement configuration information comprising the determined measurement bandwidth and the measurement time; and
transmitting the measurement configuration information to the user equipment.

8. The base station according to claim 7, wherein:
while the user equipment is currently in a connected state the transmitting the measurement configuration information to the user equipment comprises using dedicated radio resource control signaling; and
while the user equipment is currently in a non-connected state, the transmitting the measurement configuration information to the user equipment comprises using a radio resource control broadcast message.

9. The base station according to claim 7, wherein:
a period of a subframe of the new carrier type cell-specific reference signal is 5 milliseconds, and
the determined measurement time corresponding to the cell in which the user equipment is located is starting time of the period of the subframe.

10. User equipment, comprising:
at least one memory storing instructions; and
at least one hardware processor to execute the instructions within the at least one memory to implement:
receiving measurement configuration information from a first base station, wherein:
the measurement configuration information comprises measurement bandwidth and measurement; time,
the measurement bandwidth and the measurement time are determined according to transmit bandwidth of a new carrier type cell-specific reference signal in a cell on which the user equipment is currently located; transmit time of the new carrier type cell-specific reference signal in the cell on which the user equipment is currently located; transmit bandwidth of a new carrier type cell-specific reference signal of a second base station; and transmit time of the new carrier type cell-specific reference signal of the second base station,
the second base station is one or a plurality of base stations, and
an inter-base-station interface exists between the second base station and the first base station;
parsing the received measurement configuration information to obtain the measurement bandwidth and the measurement time; and
performing measurement by using the measurement bandwidth and the measurement time to obtain a measurement result.

11. The user equipment according to claim 10, wherein:
while the user equipment is in a connected state, receiving the measurement configuration information by using dedicated radio resource control signaling; and
while the user equipment is in a non-connected state, receiving the measurement configuration information by using a radio resource control broadcast message.

12. The user equipment according to claim 10, wherein:
a period of a subframe of the new carrier type cell-specific reference signal is 5 milliseconds, and
measurement is performed by using starting time of the period of the subframe as the measurement time.

13. A base station, comprising: a receiver, a processor, a memory, and a transmitter, wherein:
the base station is a first base station;
the receiver is configured to acquire transmit bandwidth and transmit time of a new carrier type cell-specific reference signal in a cell of a second base station through an inter-base-station interface, wherein the second base station is one or a plurality of base stations, and wherein the inter-base-station interface exists between the second base station and the first base station; and
the processor is configured to:
determine, according to transmit bandwidth of a new carrier type cell-specific reference signal in a cell of the first base station; transmit time of the new carrier type cell-specific reference signal in the cell of the first base station; the transmit bandwidth of the new carrier type cell-specific reference signal in the cell of the second base station which is received by the receiver; the transmit time of the new carrier type cell-specific reference signal in the cell of the second base station which is received by the receiver, measurement bandwidth and measurement time corresponding to a cell in which user equipment is located; and
instruct the transmitter to transmit measurement configuration information comprising the measurement bandwidth and the measurement time to the user equipment.

14. The base station according to claim 13, wherein the instruction of the transmitter further comprises
while the user equipment is currently in a connected state, the processor instructs the transmitter to transmit, by using dedicated radio resource control signaling, the measurement configuration information comprising the measurement bandwidth and the measurement time to the user equipment; and
while the user equipment is currently in a non-connected state, the processor instructs the transmitter to transmit, by using a radio resource control broadcast message, the measurement configuration information comprising the measurement bandwidth and the measurement time to the user equipment.

15. The base station according to claim 13, wherein:
a period of a subframe of the new carrier type cell-specific reference signal is 5 milliseconds, and
the measurement time, that is transmitted by the transmitter by and that corresponds to the cell in which the user equipment is located, is starting time of the period of the subframe.

16. User equipment, comprising: a receiver, a transmitter, a processor, and a memory, wherein:
the receiver is configured to receive measurement configuration information from a first base station, wherein:
the measurement configuration information comprises measurement bandwidth and measurement time; and
the measurement bandwidth and the measurement time are determined according to transmit bandwidth of a new carrier type cell-specific reference signal in a cell on which the user equipment is currently located, transmit time of the new carrier type cell-specific reference signal in the cell on which the user equipment is currently located, transmit bandwidth of a new carrier type cell-specific reference signal of a second base station, and transmit time of the new carrier type cell-specific reference signal of the second base station;
the processor is configured to parse the measurement configuration information received by the receiver to obtain the measurement bandwidth and the measurement time, and perform measurement by using the measurement bandwidth and the measurement time to obtain a measurement result;
the second base station is one or a plurality of base stations; and
an inter-base-station interface exists between the second base station and the first base station.

17. The user equipment according to claim 16, wherein the receiver is configured to:
receive the measurement configuration information by using dedicated radio resource control signaling while the user equipment is in a connected state; and
receive the measurement configuration information by using a radio resource control broadcast message while the user equipment is in a non-connected state.

18. The user equipment according to claim 16, wherein:
a period of a subframe of the new carrier type cell-specific reference signal is 5 milliseconds, and
the processor performs measurement by using starting time of the period of the subframe as the measurement time.

* * * * *